(12) United States Patent
Schwarz et al.

(10) Patent No.: US 8,375,203 B2
(45) Date of Patent: Feb. 12, 2013

(54) METHOD AND SYSTEM FOR SECURE REMOTE TRANSFER OF MASTER KEY FOR AUTOMATED TELLER BANKING MACHINE

(76) Inventors: Henry Samuel Schwarz, New York, NY (US); Daryll Paul Cordeiro, Atlanta, GA (US)

(*) Notice: Subject to any disclaimer, the term of this patent is extended or adjusted under 35 U.S.C. 154(b) by 770 days.

(21) Appl. No.: 12/191,073

(22) Filed: Aug. 13, 2008

(65) Prior Publication Data
US 2009/0077374 A1 Mar. 19, 2009

Related U.S. Application Data

(60) Provisional application No. 60/955,716, filed on Aug. 14, 2007.

(51) Int. Cl.
*H04L 29/06* (2006.01)
(52) U.S. Cl. .......................... 713/156; 726/36
(58) Field of Classification Search .................. 713/156
See application file for complete search history.

(56) References Cited

U.S. PATENT DOCUMENTS

| | | | |
|---|---|---|---|
| 4,933,971 A | 6/1990 | Bestock | |
| 5,517,567 A | 5/1996 | Epstein | |
| 5,745,576 A | 4/1998 | Abraham et al. | |
| 5,761,306 A | 6/1998 | Lewis | |
| 5,805,705 A | 9/1998 | Gray et al. | |
| 6,038,322 A * | 3/2000 | Harkins | 380/279 |
| 6,327,578 B1 * | 12/2001 | Linehan | 705/65 |
| 6,853,729 B1 | 2/2005 | Mizikovsky | |
| 7,000,829 B1 | 2/2006 | Harris et al. | |
| 7,110,986 B1 | 9/2006 | Zajkowski et al. | |
| 7,156,299 B1 | 1/2007 | Harris et al. | |
| 7,159,114 B1 | 1/2007 | Zajkowski et al. | |
| 7,216,083 B2 * | 5/2007 | Parmelee et al. | 705/64 |
| 7,229,009 B1 | 6/2007 | Parsons et al. | |
| 7,418,592 B1 * | 8/2008 | Zajkowski et al. | 713/156 |
| 2002/0026575 A1 * | 2/2002 | Wheeler et al. | 713/156 |
| 2002/0126849 A1 * | 9/2002 | Howard et al. | 380/277 |
| 2003/0070080 A1 * | 4/2003 | Rosen | 713/187 |
| 2004/0008846 A1 | 1/2004 | Medvinsky | |
| 2004/0030887 A1 * | 2/2004 | Harrisville-Wolff et al. | 713/155 |

OTHER PUBLICATIONS

Nakakita, H; A Study on Secure Wireless Networks Consisting of Home Appliances; May 2003; IEEE; vol. 49 Issue:2; On pp. 375-381.*
International Standard, ISO/IEC 9798-3, Information technology—Security techniques—Entity authentication—Part 3: Mechanisms using digital signature techniques, Second edition, Oct. 15, 1998.

(Continued)

*Primary Examiner* — Mohammad W Reza
*Assistant Examiner* — Monjour Rahim
(74) *Attorney, Agent, or Firm* — Paul M. Sykes; Bradley Arant Boult Cummings LLP (57) ABSTRACT

A method for securely transferring a master key from a host to a terminal, such as an automated teller machine, is disclosed. Each of the host and terminal is initialized with a certificate, signed by a certificate authority, and containing a public key used in used in connection with public key infrastructure communication schemes. An identifier of an authorized host is stored in the terminal. Upon receiving a communication from a host including a host certificate, the terminal validates whether it is already bound to a host, if not, whether the host identifier of the remote host matches the preloaded authorized host identifier, before further communicating with the remote host, including the exchange of certificates. In this way, the terminal is protected against attacks or intruders. Following the exchange of certificates, the host may securely transfer the master key to the terminal in a message encrypted under the terminal's public key. The terminal may decrypt the message, including the master key, using its corresponding secret key.

17 Claims, 5 Drawing Sheets

OTHER PUBLICATIONS

International Standard, ISO/IEC 11770-3, Information technology—Security techniques—Key Management—Part 3: Mechanisms using asymmetric techniques, First edition, Nov. 1, 1999.

Committee IT/05, Financial Transaction Systems, Australian Standard, AS 2805.6.5.3-1992, Electronic Funds transfer—Requirements for interfaces, Part 6.5.3: Key Management—TCU initialization—Asymmetric, Sep. 14, 1992.

Committee IS/5, Electronic Funds Transfer, Australian Standard, AS 2805.6.1-1988, Electronic Funds Transfer—Requirements for Interfaces, Part 6.1—Key Management-Principles, Feb. 5, 1988.

Mark Ames, Secure Crypographic Initialisation of Remote Terminals in an Electronic Funds Transfer/Point of Sale Systems, 1990, vol. 453/1990, East Melbourne Victoria, Australia.

Fr. M. Blake Greenlee, Requirements for Key Management Protocols in the Wholesale Financial Industry, IEEE Communications Magazine, Sep. 1995, vol. 23, No. 9.

Barbara Fox and Brian Lamacchia, Online Certificate Status Checking in Financial Transactions: The Case for Re-issuance, Financial Cryptography, Matthew Franklin (Ed.), Third International Conference, FC'99 Anguilla, British West Indies, Feb. 22-25, 1999 Proceedings.

Moni Naor and Kobbi Nissim, Certificate Revocation and Certification Update, IEEE Journal on Selected Areas in Communications, Apr. 2000, vol. 18, No. 4.

Eric H. Michelman, The Design and Operation of Public-key Cryptosystems, National Computer Conference, 1979, Intel Corporation, Santa Clara, California.

Yu-Lun Huang, Shiuh-Pyng Winston Shieh, Jian-Chyuan Wang, Practical Key Distributions Schemes for Channel Protection, 2000, IEEE Computer Society 24th Annual International Computer Software and Applications Conference.

Richard J. Johnstone, Key Updating Flags in EFT-POS Security Systems, North-Holland Computers and Society 6 (1987) 245-251, Elsevier Science Publishers B.V. (North-Holland).

Office of Infosec Research and Technology, Secure In-Band Update of Trusted Certificates, IEEE 8th International Workshops on Enabling Technologies: Infrastructure for Collaborative Enterprises (WET ICE'99), IEEE Computer Society 1999, pp. 168-73, Los Alamitos, CA, USA.

Marc Girault, Self-certified Public Keys, Advances in Cryptology—Eurocrypt '91, Workshop on the Theory and Application of Cryptographic Techniques, D.W. Davies (Ed.) 1991, Springer-Verlag.

K.W. TSE, K.P. Chow, Message Encryption in a X.400 Message Handling System, 1990 IEEE Region 10 Conference on Computer and Communication Systems, 1990, Conference Preceedings, vol. 1 of 2.

European Committee for Standarization, CEN Workshop Agreement 14050-06 Extensions for Financial Services (XFS) interface specification—Release 3.03—Part 6: PIN Keypad Device Class Interface—Programmer's Reference, Jan. 2005.

Menezes A. J., "Chapter 10: Identification and Entitiy Authentication ED", Handbook of Applied Cryptography; CRC Press Series on Discrete Mathetmatices and Its Applications, Oct. 1, 1996; pp. 385-424; Baco Raton, Florida.

* cited by examiner

METHOD AND SYSTEM FOR SECURE REMOTE TRANSFER OF MASTER KEY FOR AUTOMATED TELLER BANKING MACHINE

PRIORITY CLAIM

This application claims priority to and the benefit of provisional patent application No. 60/955,716, filed Aug. 14, 2007, in the United States Patent and Trademark Office.

BACKGROUND

The present invention relates generally to the area of encryption of messages sent from one device to another, in this case, between an automated teller banking machine (ATM) and a host computer. More specifically, the present invention relates to securely transferring a "master key" from a host to a remote ATM over a communications network. As used herein, "ATM" refers to any automated banking or teller machine, as well as any other terminal or communications used in making financial transactions or directives, the communications for which are secured using symmetric encryption techniques. A "host" may refer to a computer or communications system at a bank, other financial institution, a transaction processor, acquirer, switch, or other entity authorizing and/or executing financial transactions or directives made from an ATM.

When an ATM sends to a host a message containing a customer's PIN number and a request to transfer funds to/from the associated account, the PIN number is securely encrypted to prevent persons from obtaining this information and accessing the customer's account without authorization. When an ATM sends to a host or receives from a host a sensitive message, a Message Authentication Code or MAC may be appended to the message to ensure the authenticity and integrity of the message. When an ATM sends to a host or receives from a host a sensitive message, some or all of said message may be encrypted to ensure the privacy of the message. More specifically, the encryption of the PIN, the generation and verification of the MAC, and the encryption and decryption of some or all of the message, are performed by an Encrypting PIN Pad or EPP on the ATM. That is, the EPP itself contains a processor programmed with instructions to perform these cryptographic operations. These cryptographic operations are performed according to published standards that are known to those skilled in the art.

A typical ATM may include an output device such as a video display for communicating with a customer or an operator, an input device such as a keypad or touchscreen functionality as part of the display, a card reader mechanism for reading a customer's ATM card, a cash dispenser mechanism, a depository mechanism for accepting deposits into the machine, a receipt printer, and a computer system in operative communication and control of the foregoing components for processing input and output and performing tasks The computer system contains a processor programmed with software, including an operating system, to communicate with and control the foregoing devices to cause them to correctly perform their respective functions, and including to communicate with the EPP and with external systems over a communications network, using protocols suitable to that network. Where it is stated herein that an EPP communicates with a host, or vice versa, it should be understood that the communication occurs through the software and hardware of the ATM in which the EPP is an operative part. Further, while the foregoing description is applicable to an ATM that processes banking transactions, not all banking ATMs will have all such components (such as the depository mechanism), and the principles of the invention disclosed herein are applicable to other secure terminals that process financial transactions that do not contain a cash dispenser, such as a terminal in a gasoline pump.

"Working keys" are used to encrypt the PIN, to generate and verify a MAC, and to encrypt and decrypt some or all of the messages described above. The working keys are initially exchanged between the ATM and host over a communications network, which may not be secure. For security, the working keys are therefore enciphered under "master keys" or "terminal master keys" during the exchange. The master keys must be known to both the ATM and the host.

A master key must be loaded into the EPP in a secure manner. In the past, this has been accomplished by having two persons, each knowing only a portion of master key code, manually enter his portion of the code into the ATM in a secure environment. Then, the ATM would execute an algorithm to generate the master key from the data manually input by the two operators. It can be expensive and cumbersome to deploy two human operators to load the master keys into the EPP.

The present invention relates to a method and system to securely and remotely load the master keys, that is, from a host machine to the EPP/ATM over a communications network. This process may be referred to as remote key transfer (RKT). The purpose of RKT methodology is to validate that the transfer is taking place between the known and intended entities (the particular host and EPP involved) and to securely encrypt the master keys during transfer. The present invention also provides a secure method for RKT transfer that will allow the EPP/ATM to become associated with a new host (for example, if the ATM was sold) without compromising or using any information (including the master key) associated with the previous host and without a requirement to replace the EPP, to reload a new EPP certificate, or reload a new EPP secret key.

SUMMARY

One embodiment of the present invention comprises a method of securely transferring a master key from a host to a remote ATM, in which the host has a certificate signed by a certificate authority with a public key for the host used for encryption-decryption, and the ATM has a certificate signed by the certificate authority with a public key for the ATM used for encryption-decryption, and both the host and the ATM have the public key of the certificate authority, which may be used for validating the authenticity of certificates signed by the certificate authority, under its secret key. The host and ATM also have the secret keys corresponding to their respective public keys. A value representing an identifier of a host with which the ATM is authorized to communicate, or $ID_{Host}$, is stored in the ATM, preferably in a secure environment. Then, over a network, including a non-secure network, the ATM, upon receiving a communication from an unknown or new remote host that includes an identifier of the remote host verifies whether the ATM has previously established communications with any host. If the ATM has established communications with a host, the ATM halts communications with the remote host. In a preferred embodiment, the remote host communicates its host certificate, including its identifier to the ATM, and the ATM in verifying whether it has previously established communications with a host, determines whether it has previously accepted a host certificate. In a further preferred embodiment, the ATM is programmed to accept a host certificate only one time after the authorized $ID_{Host}$ has been loaded into the ATM. In this way, once the ATM has bound itself to an authorized host by accepting its certificate, the ATM will not establish communications with another remote host, thus preventing attacks or intrusions. If, however, the ATM has not previously established communications with a host, the ATM then compares the remote host's identifier with the authorized host's identifier. If the identifiers do not match, the ATM halts communication with the remote host, as it is not the authorized host. If the remote host's identifier matches the authorized host's identifier, then the ATM accepts the host's certificate and sends to the host the ATM's first certificate, which contains its public encryption-decryption key. The host then sends to the ATM a message, encrypted under the ATM's public encryption key, containing the terminal master key. The ATM, using the corresponding secret key, decrypts the message to obtain the master key. The ATM and host then may use the master key to encrypt and decrypt working or session keys. Should the ATM need to be transferred to a new host, its authorized $ID_{Host}$ may be reset in a secure environment, typically manually using a double-password protected utility or other secure challenge-response protocol. Upon resetting of the $ID_{Host}$, all data associated with or derived from the previous host, including its $ID_{Host}$, the host's certificate, the master keys and master key names, and any working keys utilized with the former host are destroyed. The ATM is then able to receive a new host certificate.

DESCRIPTION OF DRAWINGS

These and other features, aspects, structures, advantages, and functions are shown or inherent in, and will become better understood with regard to, the following description and accompanied drawings where.

DETAILED DESCRIPTION

Figure 1:
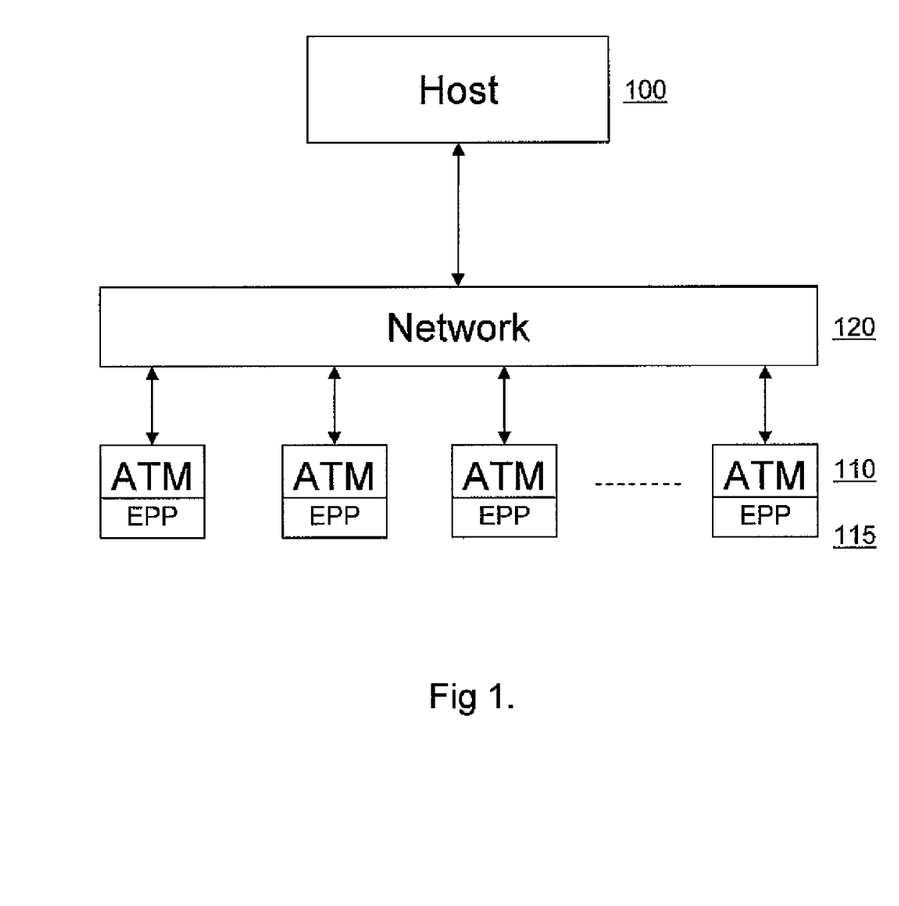
FIG. 1 is a block diagram of a host and a plurality of ATMs in communication over a communications network.

Referring to FIG. 1, the present invention provides a system and method for securely transferring a master key from a host 100 to an ATM 110 over a communications network 120. The network 120 may not be secure. There may be multiple hosts, each with multiple ATMs communicating, over the network 120. The terms "host," "ATM," and "EPP" are defined above. In addition, the following terms and conventions are used throughout this description:

Certificate Authority ("CA"). A CA is trusted third party that issues digital certificates for use by other parties, which contain a public key and the identity of the owner used in connection with public key infrastructure (PKI) communication schemes. By signing a certificate for an entity, the CA attests that the public key contained in the certificate belongs to the entity noted in the certificate, that is, with respect to the present invention, that the certificate belongs to a particular host or EPP. An exemplary Certificate Authority is VeriSign, Inc., of Mountain View, Calif.

Public Key ("PK"). A public key associated with a digital certificate issued by the CA for a particular entity.

Secret Key ("SK"). The private or secret key known only to a particular entity, and corresponding to that entity's public key according to established cryptography standards, such as RSA cryptography. In a preferred embodiment, the public and secret (private) keys described herein are compliant with the PKCS#1 standard and have a modulus length of 2048 bits.

ID. A unique identifying number or designation assigned to a particular entity, such as an EPP or a host.

CertReq(SK, PK, ID). A request for a certificate submitted by an entity to the CA, signed under the entity's secret key SK, containing its public key PK and its unique identifier ID. In a preferred embodiment, certificate requests are PKCS#10 compliant.

Certificate(SK, PK, ID). Certificate, issued by and signed under the CA's secret key SK, containing public key PK and unique identifier. In a preferred embodiment, certificates may be compliant with the X.509 standard.

Encrypted(PK, D). Encryption under public key PK of data D. In a preferred embodiment, RSA encryption may be used.

Signed(SK, X1|X2| . . . ). Each datum X1, X2, . . . , as well as the signature under secret key SK of the digest of X1, X2, . . . .

Figure 2:
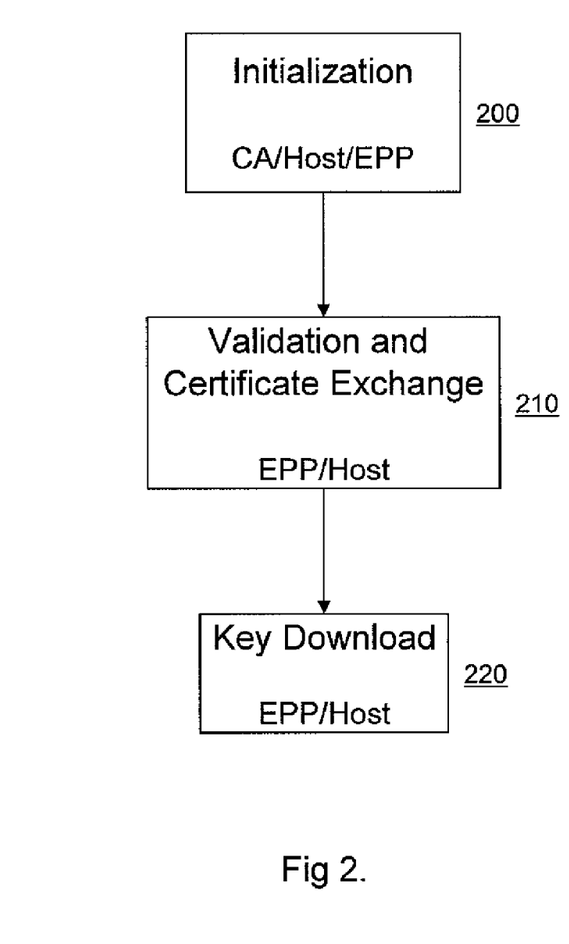
FIG. 2 is a flow diagram of an overview of one embodiment of the method of the present invention.

FIG. 2 provides an overview of one embodiment of the method of the present invention, which comprises three basic phases. Each phase is described in greater detail in FIGS. 3-5. In the initialization phase 200, the CA, host, and EPP are initialized with their digital certificates and corresponding public and private keys, and with their unique identifiers. As described below, well-known Public Key Cryptography Standards (PKCS) using RSA cryptography are used herein to construct public-secret key pairs, which are in turn used in transferring the master key from the Host 100 to the EPP 115 of ATM 110. In the initialization phase 200, the respective identifiers and public-secret key pairs for the CA, Host 100 and EPP 115 are generated, the CA issues its own digital certificate, and the CA issues the digital certificates for the Host 100 and EPP 115. The steps involved in the initialization phase 200 preferably occur in a secure environment, using a secure communications channel where required. During the validation and certificate exchange phase 210, the EPP 115 validates the identity of the Host 100, and, if the validation is successful, the EPP and Host exchange certificates. Finally, in phase 220, with the Host 100 and EPP 110 having confirmed the other's identity, the Host 100 transfers the Master Key to the EPP. Phases 210 and 220 may occur over a non-secure communications network.

Figure 3A:
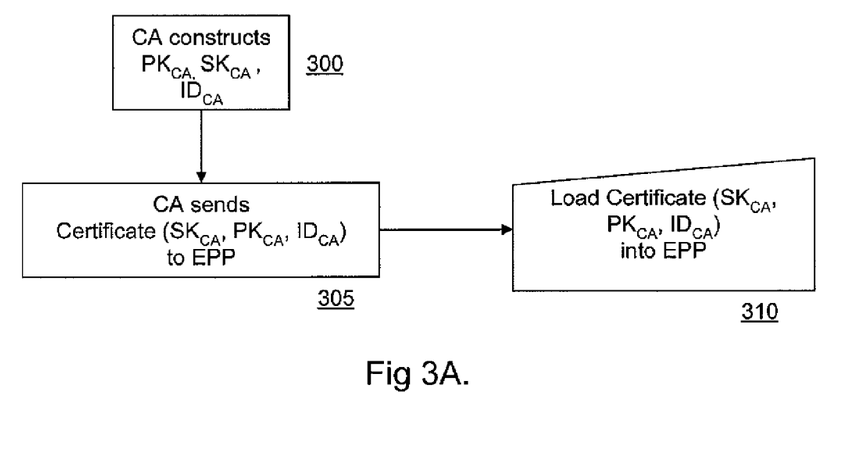
FIG. 3A is a flow diagram of the initialization phase with respect to the Certificate Authority (CA), in accordance with one embodiment of the method of the present invention.

FIG. 3A is a flow diagram illustrating the steps to initialize the CA. In steps 300 and 305, the CA constructs its certificate and sends it to the EPP, and more particularly, to the entity responsible for manufacturing or programming the EPP. This entity will be referred to as the EPP provider herein. As used herein, the term "constructs" means to create, generate, or assign for the first time. In step 310, the CA's certificate is loaded into the EPP. This step may be performed in a variety of ways known in the art, including "copying and pasting" the CA certificate into the EPP's firmware source code, or connecting the EPP to a PC in a secure facility and "injecting" the CA certificate from the PC into the EPP. As a result of this initialization process, the EPP has the public key of the CA and can verify the authenticity of messages signed under the CA's secret key.

Figure 3B:
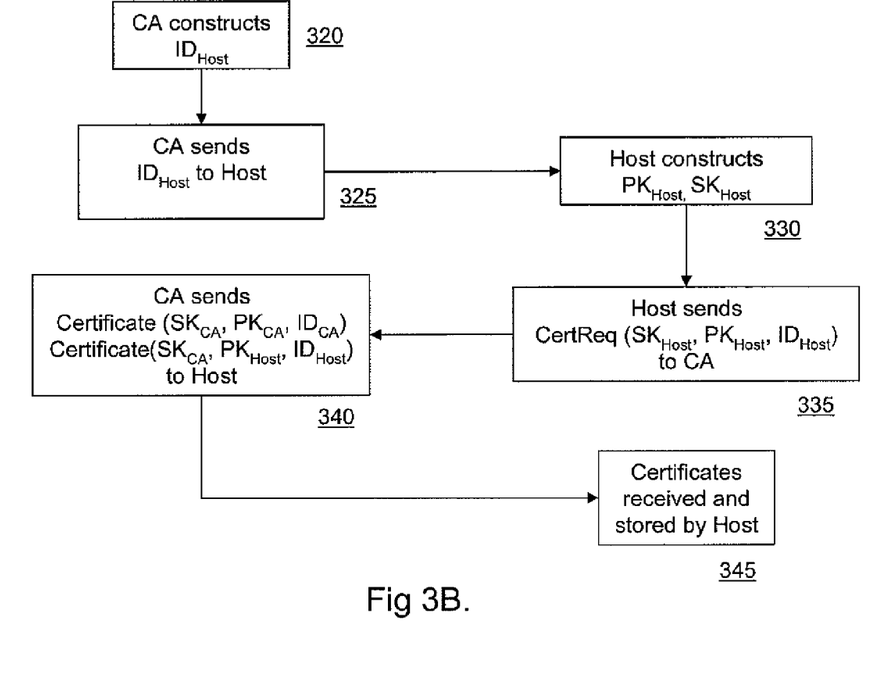
FIG. 3B is a flow diagram of the initialization phase with respect to the initialization of the host, in accordance with one embodiment of the method of the present invention.

FIG. 3B is a flow diagram illustrating the steps to initialize the Host. Referring to FIG. 3B, in steps 320 and 325, the CA constructs and transmits to the host a unique identifier for the host, $ID_{Host}$. In a preferred embodiment, $ID_{Host}$ is 16-digit numeric number, each digit in the range of 0-9 inclusive. It should be noted that this step could be performed by some entity other than a CA, for example, by the manufacturer of the ATM systems that will utilize the RKT method described herein, or some other entity assigned the role of constructing and assigning unique identifiers to hosts. The $ID_{Host}$ identifies the host entity with which the ATM containing the subject EPP will be used. Typically, a single bank or transaction processor will have its own unique $ID_{Host}$ utilized by ATMs for which the bank or transaction processor processes transactions. In step 330, the Host constructs its public key $PK_{Host}$ and corresponding secret key $SK_{Host}$ utilizing known cryptographic algorithms. In step 335, the Host issues a request for a certificate to the CA, and in step 340, the CA returns the Host's certificate and the CA's certificate to the Host. In step 345, the Host accepts and stores these certificates.

Figure 3C:
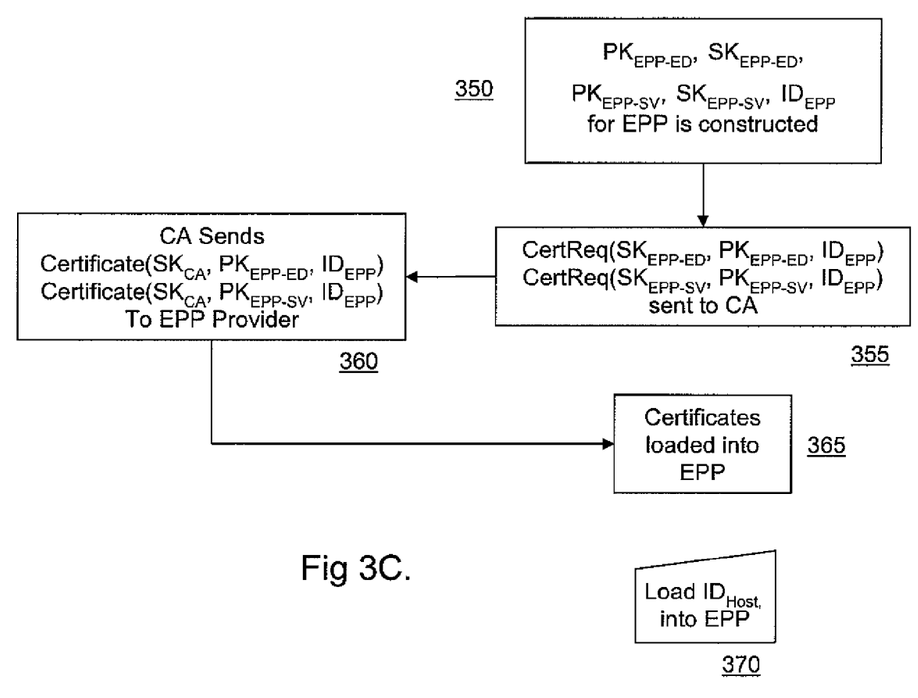
FIG. 3C is a flow diagram of the initialization phase with respect to the initialization of the EPP, in accordance with one embodiment of the method of the present invention.

FIG. 3C is a flow diagram illustrating the steps to initialize the EPP. These steps are preferably performed by the EPP provider before an ATM containing the EPP is placed into service. In step 350, the encryption-decryption public-secret key pair ($PK_{EPP\text{-}ED}$, $SK_{EPP\text{-}ED}$), and the sign-verify public key-secret key pair ($PK_{EPP\text{-}SV}$, $SK_{EPP\text{-}SV}$) for the EPP are constructed. The EPP is also assigned an identifier, $ID_{EPP}$, which preferably is unique for each EPP. In a preferred embodiment, $ID_{EPP}$ is 16-digit numeric number, each digit in the range of 0-9 inclusive. In step 355, the EPP provider issues a request for certificates for both the EPP's encryption-decryption public key and its sign-verify public key. In step 360, the CA issues these certificates and sends them to the EPP provider, which stores them in the EPP. In a preferred embodiment, the EPP verifies that the certificates' $PK_{EPP\text{-}ED}$, $PK_{EPP\text{-}SV}$, and $ID_{EPP}$ equal the actual values of those data, and that the certificates have not expired. Preferably, loading these two certificates into the EPP may be performed only one time, to protect the EPP against unauthorized or bogus CAs.

In addition, as part of the initialization of the EPP, the $ID_{Host}$ corresponding to the particular host with which the EPP is intended to be utilized, is loaded into the EPP. Loading of the $ID_{Host}$ into the EPP need not occur in any particular sequence with respect to the other EPP initialization steps illustrated in FIG. 3C. The $ID_{Host}$ typically will be loaded into the EPP manually by an operator by entering $ID_{Host}$ into the EPP's keyboard, and may require access to password-protected management functions of the EPP's internal software. Alternatively, in an appropriately secure environment, it may be desirable to load the $ID_{Host}$ into the EPP directly via an automated data transfer.

Figure 4:
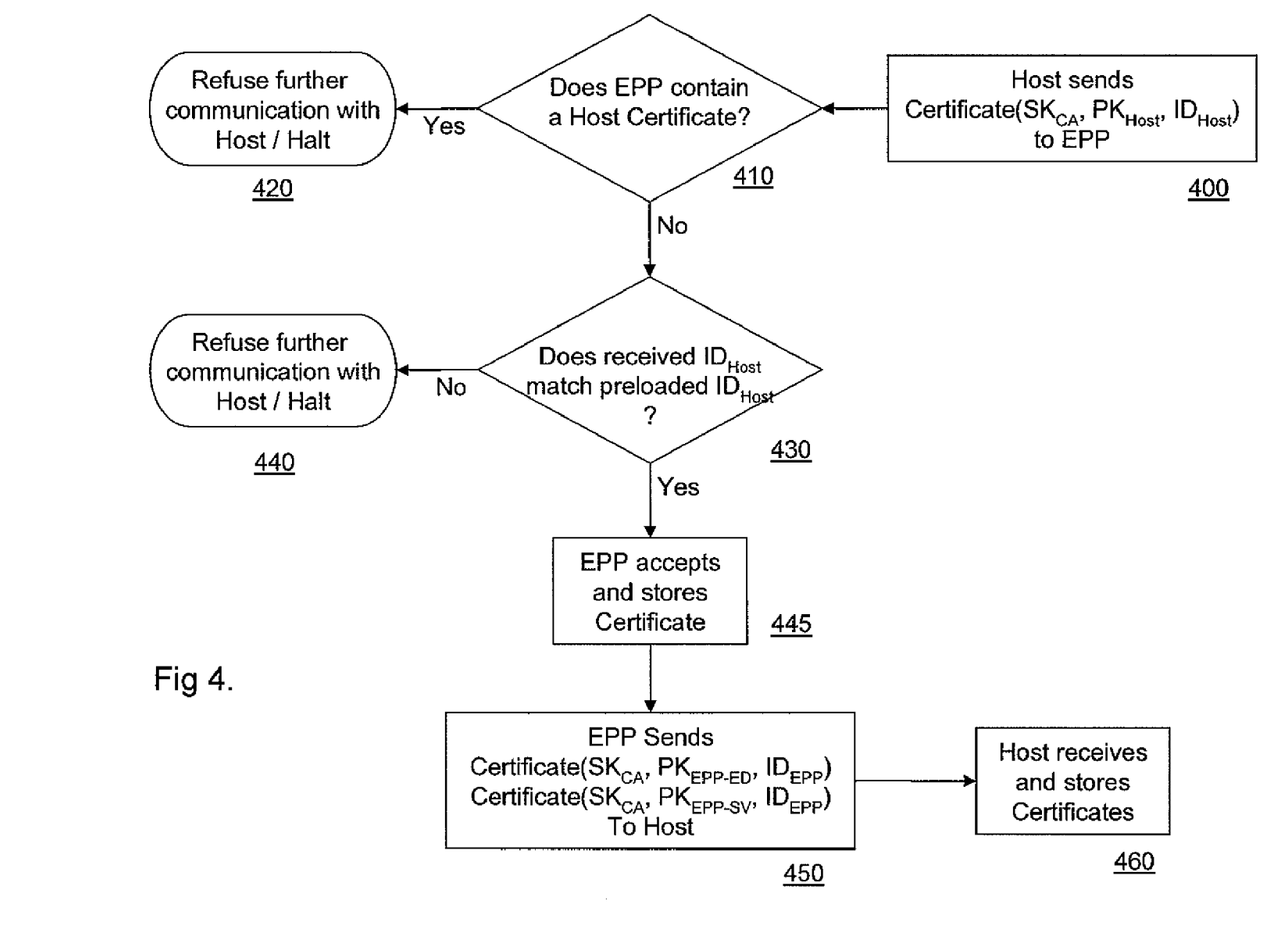
FIG. 4 is a flow diagram of the EPP's validation of the host prior to transfer of the master key, in accordance with one embodiment of the method of the present invention.

FIG. 4 is a flow diagram illustrating the steps involved in the validation of the Host by the EPP, and certificate exchange between them, prior to the master key download. In step 400, the Host sends its certificate, containing its $ID_{Host}$ to the EPP over a communications network, which may be an unsecured network, using any suitable protocol. Upon receiving a certificate from a host, the EPP in step 410 is programmed to determine whether it already has loaded a host certificate. (More specifically, the EPP is programmed to allow the command for loading a host certificate to be called only one time after $ID_{Host}$ has been preloaded). The EPP is permitted only to communicate with a single host, and, for security, the identity of this host cannot be changed remotely. If the EPP already contains a host certificate (that is, it has previously run the command to load a host certificate after $ID_{Host}$ was preloaded), this indicates to the EPP that it is already bound to a valid host and that the host certificate received over the network may be that of an attacker or other unauthorized party. Thus, if the EPP already contains a host certificate, the EPP in step 420 halts the process and refuses further communication with the new host over the network. If the EPP does not contain a host certificate, this indicates it has not been bound to a host, and the EPP proceeds to step 430 to verify the identity of the Host.

In step 430, the EPP compares the $ID_{Host}$ received from the Host over the network with the $ID_{Host}$ that was preloaded into the EPP during the initialization process, at step 370. If the $ID_{Host}$ received over the network does not match the preloaded $ID_{Host}$ this indicates to the EPP that the host certificate received over the network may be that of an attacker or other unauthorized party, and the EPP in step 440 halts the process and refuses further communication with the unauthorized host over the network. If the $ID_{Host}$ received over the network matches the preloaded $ID_{Host}$, the EPP in step 445 accepts and stores the host certificate, and proceeds to step 450, in which the EPP sends its sign-verify and encryption-decryption certificates, containing the corresponding public keys, to the Host. In a preferred embodiment, the EPP and Host may also use the CA certificate to verify the other's certificate. In step 460, the Host receives and stores these certificates, and now may securely communicate with the EPP.

Figure 5:
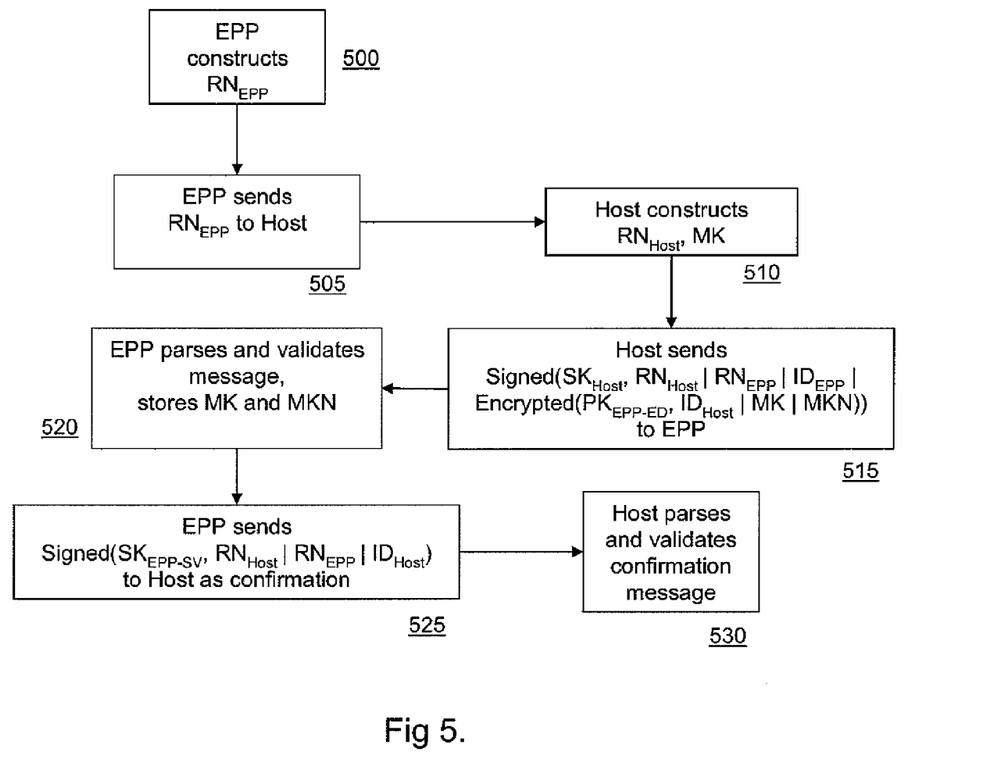
FIG. 5 is a flow diagram of the transfer of the master key from the host to the EPP, in accordance with one embodiment of the method of the present invention.

FIG. 5 illustrates the remote transfer of the master key from the Host to the EPP. In step 500, the EPP constructs a random number $RN_{EPP}$, using any algorithm or methodology known in the art to generate random numbers. The EPP sends this random number to the Host in step 505. In step 510, the Host constructs a second random number $RN_{Host}$ and the master key MK. In a preferred embodiment, random numbers $RN_{EPP}$ and $RN_{Host}$ may be 8-byte binary numbers which ensures the uniqueness of the data and prevents "replay" by an attacker who previously captured another instance of this data as it passed through a public network. The master key MK typically will be a 3DES key of sixteen binary bytes, each byte parity adjusted. The master key MK has associated with it a master key name MKN, which specifies whether the master key is used for working keys for PIN encryption, MACing, or message encryption. In step 515, the Host concatenates its $ID_{Host}$, MK, and MKN and enciphers this message using the encryption-decryption public key of the EPP. This enciphered message is in turn concatenated with $RN_{EPP}$, $RN_{Host}$, and $ID_{EPP}$, signed under the Host's secret key, and sent to the EPP. In step 520, the EPP validates the Host's signature with the Host's public key transmitted to it previously, parses the message into its constituent parts, and deciphers the encrypted message containing the master key MK with the EPP's encryption-decryption secret key. The EPP contains programming instructions to parse the concatenated message and isolate the master key MK from the random numbers and ID components of the message. The EPP may confirm that the value of $RN_{EPP}$ received from the Host in step 520 matches the value of $RN_{EPP}$ sent to the Host in step 505. The EPP then stores the master key in a secure memory. In step 525, the EPP sends to the Host a message signed under the EPP's sign-verify secret key and containing a concatenation of $RN_{Host}$, $RN_{EPP}$, and $ID_{Host}$. The Host verifies the EPP's signature with the EPP's public key, parses the message to extract $RN_{Host}$, compares the value of $RN_{Host}$ received from the EPP with the value of $RN_{Host}$ constructed in step 510, and therefore validates that the EPP received and correctly parsed the message containing the master key. Those skilled in the art will appreciate that other challenge/response and verification techniques and protocols may be used to confirm and validate that the transfer of the master key was successful.

In a preferred embodiment, the elements of the cryptographic scheme illustrated in steps 515 and 525 are compliant with the PKCS#7 standard.

As a result of the foregoing procedures, the EPP contains a master key, under which working keys may be enciphered and transferred between the Host and EPP. Steps 500 through 530 may be repeated for any further master keys.

In one embodiment, rather than using the values of $ID_{Host}$ and $ID_{EPP}$ in the encrypted messages shown in steps 515 and 525, an issuer AndSerialNumber sequence may be used instead for compliance with the PKCS#7 standard and XFS ("Extension for Financial Services") requirements. In this embodiment, the issuer AndSerialNumber contains the CA's distinguished name and the certificate's serial number assigned by the CA, thereby uniquely specifying a certificate. The value of the ID ($ID_{Host}$ or $ID_{EPP}$) can be extracted from the subject certificate's distinguished name.

It may be necessary or desirable for an ATM to be transferred from one host (e.g., bank) to another. In this situation, the ATM, and specifically the EPP within the ATM, must be able to communicate with the new host, and all data associated with the former host must be destroyed. The present invention provides a method for facilitating the transfer of an ATM, including its EPP, from one host to another.

The internal software (firmware) of the EPP includes a secure management utility, access to which is preferably protected by at least two passwords or other secure challenge/response protocol. The EPP's management utility allows an operator to manually change the value of $ID_{Host}$ stored within the EPP. When $ID_{Host}$ is changed, the EPP is programmed to destroy all data associated with or derived from the previous host, including its $ID_{Host}$, the host's certificate, the master keys and master key names, and any working keys utilized with the former host. As a result of this operation, the EPP no longer contains a host certificate and contains a new value of $ID_{Host}$. The EPP may now receive a new host certificate and load a new master key by repeating steps 400-460 and steps 500-530, described above. For security, the EPP will not accept a new host certificate, and proceed with downloading a new master key, unless the value of $ID_{Host}$ has been manually reset.

Although the present invention has been described and shown with reference to certain preferred embodiments thereof, other embodiments are possible. The foregoing description is therefore considered in all respects to be illustrative and not restrictive. Therefore, the present invention should be defined with reference to the claims and their equivalents, and the spirit and scope of the claims should not be limited to the description of the preferred embodiments contained herein.

What is claimed is:

1. A method of securely transferring a master key from a host to a remote automated banking machine ("ATM"), wherein said host comprises a certificate signed by a certificate authority comprising a public key for said host, and said ATM comprises a first certificate signed by the certificate authority comprising a first public key for said ATM, and wherein each of said host and ATM comprise the public key of said certificate authority, said method comprising:

(a) storing in the ATM a value representing an identifier of a host with which the ATM is authorized to communicate, and
   over a network, including a non-secure network, (b) receiving a communication from a remote host comprising an identifier of the remote host;

(c) comparing the remote host's identifier with the authorized host's identifier, and if the identifiers do not match, halting communication with the remote host;

(d) if the remote host's identifier matches the authorized host's identifier, then accepting the host's certificate and sending to the host the ATM's first certificate;

(e) receiving from the host encrypted data comprising a master key encrypted using the first public key of the ATM; and (f) decrypting said encrypted data, including said master key, using a first secret key of the ATM corresponding to ATM's first public key.

2. The method of claim 1, wherein the communication from the remote host in step (b) comprises the certificate of the host and said certificate comprises the value representing the identifier for the remote host.

3. The method of claim 2, further comprising, prior to step (c), verifying whether the ATM has previously established communications with a host, and if so, halting communications with the remote host.

4. The method of claim 3, wherein step (c) comprises determining whether the ATM has previously accepted a host certificate.

5. The method of claim 4, wherein the ATM is operable to accept a host certificate only once after it has stored the authorized host's identifier in step (a).

6. The method of claim 1, wherein said acceptance step (d) comprises validating the host's certificate using the public key of the certificate authority.

7. The method of claim 1, wherein the ATM comprises a second certificate, signed by the certificate authority and containing a second public key, and in said step (d), sending to the host the ATM's second certificate, and further comprising, following said decrypting step (f), sending an acknowledgment message to the host signed under a second secret key corresponding to the second public key.

8. The method of claim 1, wherein in step (a) the authorized host identifier is received from a manual input.

9. The method of claim 1, further comprising, prior to step (e), sending to said host a first random number encrypted under the first secret key of said ATM, and wherein in step (e), said encrypted data received from said host comprises said first random number signed by said host using a private key corresponding to said host's public key, and further comprising, following said decrypting step (f), verifying using the host's public key that the first random number received from said host matches the first random number sent to said host prior to step (e).

10. The method of claim 7, further comprising, prior to step (e), sending to said host a first random number encrypted under the first secret key of said ATM, and wherein in step (e), said encrypted data received from said host comprises said first random number signed by said host using a private key corresponding to said host's public key, and further comprising, prior to sending said acknowledgement message, verifying using the host's public key that the first random number received from said host matches the first random number sent to said host prior to step (e).

11. The method of claim 10, wherein in step (e), said encrypted data received from said host further comprises a second random number and wherein said verifying step comprises parsing said first and second random numbers, and wherein said acknowledgment message comprises the second random number.

12. An automated banking machine, wherein said automated banking machine is operable to communicate with a host, said host having a host certificate comprising a host identifier, said automated banking machine comprising an encrypting pin pad comprising a processor and a memory, said encrypting pin pad operable to store an identifier of a host with which said automated banking machine is authorized to communicate, said ATM operable, over a network, including a non-secure network, to perform the steps of:
- receiving a communication from a remote host comprising an identifier of the remote host;
- comparing the remote host's identifier with the authorized host's identifier, and if the identifiers do not match, halting communication with the remote host;
- if the remote host's identifier matches the authorized host's identifier, then accepting the host's certificate and sending to the host the ATM's first certificate;
- receiving from the host encrypted data comprising a master key encrypted using a first public key of the ATM; and
- decrypting said encrypted data, including said master key, using a first secret key of the ATM corresponding to the ATM's first public key.

13. The automated banking machine of claim 12, wherein said automated banking machine is further operable in a secure environment to permit re-setting of the value of the authorized host identifier and upon such resetting to destroy any information received from a previously authorized host and to permit a new host certificate to be loaded once.

14. The automated banking machine of claim 13, wherein said automated banking machine is inoperable to permit said re-setting over a network.

15. The automated banking machine of claim 13, wherein said encrypting pin pad is inoperable to store an authorized host identifier received over a network.

16. The automated banking machine of claim 12, wherein said encrypting pin pad is inoperable to store an authorized host identifier received over a network.

17. The automated banking machine of claim 12, wherein said encrypting pin pad is operable to load a host certificate only one time after said authorized host identifier has been stored.

* * * * *